(12) United States Patent
Mihara

(10) Patent No.: US 7,102,830 B2
(45) Date of Patent: Sep. 5, 2006

(54) ELECTRONIC IMAGING SYSTEM

(75) Inventor: Shinichi Mihara, Tama (JP)

(73) Assignee: Olympus Corporation, Tokyo (JP)

( * ) Notice: Subject to any disclaimer, the term of this patent is extended or adjusted under 35 U.S.C. 154(b) by 824 days.

(21) Appl. No.: 10/286,848

(22) Filed: Nov. 4, 2002

(65) Prior Publication Data
US 2004/0085472 A1    May 6, 2004

(51) Int. Cl.
*G02B 15/14*    (2006.01)
(52) U.S. Cl. .................... 359/689; 359/682
(58) Field of Classification Search ........ 359/680–682, 359/689
See application file for complete search history.

(56) References Cited

U.S. PATENT DOCUMENTS 6,498,688 B1 * 12/2002 Shibayama .................. 359/689
6,671,103 B1 * 12/2003 Itoh ............................ 359/689

* cited by examiner

*Primary Examiner*—Loha Ben
*Assistant Examiner*—William Choi

(74) *Attorney, Agent, or Firm*—Kenyon & Kenyon LLP

(57) ABSTRACT

The invention has for its object to use a zoom system that comprises a reduced number of lens elements, is compact and simplified, and has high image-formation capability, thereby achieving thorough size reductions in video cameras or digital cameras. A zoom lens for use on an electronic imaging system comprises a negative first lens group G1, an aperture stop S, a positive second lens group G2 and a positive third lens group G3. Upon zooming from the wide-angle end to the telephoto end of the zoom lens, the second lens group G2 moves only toward the object side of the zoom lens and the third lens group G3 moves in a locus different from that of the second lens group G2. The second lens group G2 is made up of a positive first lens element having an aspheric surface on its object side, a negative second lens element, a positive third lens element and a negative fourth lens element. The first and second lens elements are cemented together, and the third lens group G3 moves independently for focusing. The second lens group G2 satisfies condition (1) with respect to the Abbe numbers of the third and fourth lens elements, condition (2) with respect to the shape of the third lens element, and condition (3) with respect to the composite focal length of the third and fourth lens elements.

13 Claims, 15 Drawing Sheets

C: Cyan   M: Magenta
Ye: Yellow   G: Green

45 Shutter
46 Flash
43 Finder optical system
40 Camera
44 Finder optical path
41 Image pickup optical system
42 Phototaking optical path 45 Shutter
40 Camera
47 Liquid crystal display monitor
44 Finder optical path

ELECTRONIC IMAGING SYSTEM

BACKGROUND OF THE INVENTION

The present invention relates generally to an electronic imaging system, and more particularly to an electronic imaging system such as video or digital cameras, the depth dimension of which is diminished by providing some contrivance to an optical system portion such as a zoom lens. According to the present invention, the zoom lens is also designed to be capable of rear focusing.

In recent years, digital cameras (electronic cameras) have received attention as the coming generation of cameras, an alternative to silver-halide 35 mm-film (usually called Leica format) cameras. Currently available digital cameras are broken down into some categories in a wide range from the high-end type for commercial use to the portable low-end type.

In view of the category of the portable low-end type in particular, the primary object of the present invention is to provide the technology for implementing video or digital cameras whose depth dimension is reduced while high image quality is ensured. The gravest bottleneck in diminishing the depth dimension of cameras is the thickness of an optical system, especially a zoom lens system from the surface located nearest to its object side to an image pickup plane. To make use of a collapsible lens mount that allows the optical system to be taken out of a camera body for phototaking and received therein for carrying now becomes mainstream.

However, the thickness of an optical system received in a collapsible lens mount varies largely with the lens type or filters used. Especially in the case of a so-called + precedent type zoom lens wherein a lens group having positive refracting power is positioned nearest to its object side, the thickness of each lens element and dead space are too large to set such requirements as zoom ratios and F-numbers at high values; in other words, the optical system does not become thin as expected, even upon received in the lens mount (JP-A 11-258507). A – precedent type zoom lens, especially of two or three-group construction is advantageous in this regard. However, this type zoom lens, too, does not become slim upon received in a collapsible lens mount, even when the lens positioned nearest to the object side is formed of a positive lens (JP-A 11-52246), because the lens groups are each composed of an increased number of lens elements, and the thickness of lens elements is large. Among zoom lenses known so far in the art, those set forth typically in JP-A's 11-287953, 2000-267009 and 2000-275520 are suitable for use with electronic image pickup devices with improved image-formation capabilities including zoom ratios, angles of view and F-numbers, and may possibly be reduced in thickness upon received in collapsible lens mounts.

To make the first lens group thin, it is preferable to make the entrance pupil position shallow; however, the magnification of the second lens group must be increased to this end. Consequently, some considerable load is applied on the second lens group, and so it is not only difficult to make the second lens group itself thin but it is also difficult to make correction for aberrations. In addition, the influence of production errors grows. Thickness and size reductions may be achieved by making the size of an image pickup device small. To ensure the same number of pixels, however, the pixel pitch must be diminished and insufficient sensitivity must be covered by the optical system. The same goes true for the influence of diffraction.

To obtain a camera body whose depth dimension is reduced, a rear focusing mode wherein the rear lens group is moved for focusing is effective in view of the layout of a driving system. It is then required to single out an optical system less susceptible to aberration fluctuations upon rear focusing.

SUMMARY OF THE INVENTION

In view of such problems as referred to above, the primary object of the invention is to thoroughly slim down an image pickup system by singling out a zoom mode or zoom construction wherein a reduced number of lens elements are used to reduce the size of a zoom lens and simplify the layout thereof and stable yet high image-formation capabilities are kept over an infinite-to-nearby range, and optionally making lens elements thin thereby reducing the total thickness of each lens group and slimming down a zoom lens thoroughly by selection of filters.

According to the present invention, the aforesaid object is achievable by the provision of an electronic imaging system comprising a zoom lens and an image pickup device located on an image side of the zoom lens, wherein:

the zoom lens comprises, in order from an object side thereof, a first lens group having negative refracting power, a second lens group having positive refracting power and a third lens group having positive refracting power, and further comprises an aperture stop that is interposed between the first lens group and the second lens group and moves in unison with the second lens group, for zooming from a wide-angle end to a telephoto end of the zoom lens upon focused on an object point at infinity, the second lens group moves only toward the object side and the third lens group moves in a locus different from that of the second lens group while a spacing between adjacent lens groups varies, the second lens group comprises four lens elements or, in order from an object side thereof, a positive first lens element L21 having an aspheric surface on an object side thereof, a negative second lens element L22, a positive third lens element L23 and a negative fourth lens element L24, wherein the first lens element L21 and the second lens element L22 are cemented together, the third lens group moves independently during focusing, and the second lens group satisfies the following conditions (1), (2) and (3):

$$0 < \nu_{23} - \nu_{24} < 35 \quad (1)$$

$$-0.4 < (R_{23F} + R_{23R})/(R_{23F} - R_{23R}) < 0.6 \quad (2)$$

$$0.3 < L/f_{2R} < 0.9 \quad (3)$$

where $\nu_{23}$ is a d-line based Abbe number of the third lens element L23 in the second lens group, $\nu_{24}$ is a d-line based Abbe number of the fourth lens element L24 in the second lens group, $R_{23F}$ is an axial radius of curvature of an object side-surface of the third lens element L23 in the second lens group, $R_{23R}$ is an axial radius of curvature of an image side-surface of the third lens element L23 in the second lens group, L is a diagonal length of an effective image pickup area of the image pickup device, and $f_{2R}$ is a composite focal length of the third lens element L23 and the fourth lens element L24 in the second lens group.

Why the aforesaid arrangement is used herein, and how it works is explained.

As described above, the electronic imaging system of the present invention comprises a zoom lens and an image pickup device located on an image side of the zoom lens, wherein:

the zoom lens comprises, in order from an object side thereof, a first lens group having negative refracting power, a second lens group having positive refracting power and a third lens group having positive refracting power, and further comprises an aperture stop that is interposed between the first lens group and the second lens group and moves in unison with the second lens group, for zooming from a wide-angle end to a telephoto end of the zoom lens upon focused on an object point at infinity, the second lens group moves only toward the object side and the third lens group moves in a locus different from that of the second lens group while a spacing between adjacent lens groups varies, the second lens group comprises four lens element or, in order from an object side thereof, a positive first lens element L21 having an aspheric surface on an object side thereof, a negative second lens element L22, a positive third lens element L23 and a negative fourth lens element L24, wherein the first lens element L21 and the second lens element L22 are cemented together, and the third lens group moves independently during focusing.

In the present disclosure, the term "doublet" should be understood to comprise a plurality of lens elements wherein a lens element formed of a single medium is thought of as one unit, and the "lens component" should be understood to refer to a lens group with no air separation therein, i.e., a single lens or a cemented lens.

For reductions in the size of a two-group zoom lens of −+ construction commonly used as the zoom lens for long-standing silver-halide film cameras, it is preferable to increase the magnification of the positive rear group (the second lens group) at each focal length. To this end, it is already well known to locate an additional positive lens component as the third lens group on the image side of the second lens group, wherein the spacing between the second lens group and the third lens group is varied for zooming from the wide-angle end to the telephoto end. The third lens group has also the possibility of being used for focusing.

To attain the object of the invention, i.e., to diminish the total thickness of a lens portion upon received in a collapsible mount yet perform focusing at the third lens group, the second lens group should essentially be made up of a positive lens element (the first lens element L21) and a negative lens element (the second lens element L22) with the addition of at least a positive lens element (the third lens element L23). Preferably, a negative lens element (the fourth lens element L24) should additionally be located on the image side of the third lens element L23.

For focusing at the third lens group, aberration fluctuations become a problem. However, the incorporation of an aspheric surface in the third lens group in an amount than required is not preferable. This is because, to take advantage of that aspheric surface, astigmatism remaining at the first and second lens groups must be corrected at the third lens group. If, in this state, the third lens group moves for focusing, then aberrations are out of balance. Accordingly, when focusing is performed at the third lens group, astigmatism must be eradicated at the first and second lens group all over the zoom range.

It is thus preferable that the third lens group is constructed of a spherical lens component or a reduced amount of asphericity, an aperture stop is located on the object side of the second lens group, and the second lens group is comprised of, in order from its object side, a positive lens element (the first lens element L21), a negative lens element (the second lens element L22), a positive lens element (the third lens element L23) and a negative lens element (the fourth lens element L24).

Since the diameter of the front lens in this type can substantially be kept small, it is preferable to make the aperture stop integral with the second lens group (in the examples of the present invention given later, the aperture stop is located just before the second lens group in a one-piece form), because not only is mechanical simplification achieved but also there is little or no dead space upon the lens portion received in a collapsible mount with a reduced F-number difference between the wide-angle end and the telephoto end.

More preferably, the zoom lens should satisfy the following conditions (1), (2) and (3) with respect to the third lens element L23 and the fourth lens element L24 in the second lens group:

$$0 < \nu_{23} - \nu_{24} < 35 \quad (1)$$

$$-0.4 < (R_{23F} + R_{23R})/(R_{23F} - R_{23R}) < 0.6 \quad (2)$$

$$0.3 < L/f_{2R} < 0.9 \quad (3)$$

where $\nu_{23}$ is the d-line based Abbe number of the third lens element L23 in the second lens group, $\nu_{24}$ is the d-line based Abbe number of the fourth lens element L24 in the second lens group, $R_{23F}$ is the axial radius of curvature of an object side-surface of the third lens element L23 in the second lens group, $R_{23R}$ is the axial radius of curvature of an image side-surface of the third lens element L23 in the second lens group, L is the diagonal length of a (substantially rectangular) effective image pickup area of the image pickup device, and $f_{2R}$ is the composite focal length of the third lens element L23 and the fourth lens element L24 in the second lens group.

Condition (1) is provided to make correction for chromatic aberrations. As the lower limit of 0 is not reached, chromatic aberration of magnification is likely to remain under-corrected upon balancing longitudinal chromatic aberration against the chromatic aberration of magnification, and as the upper limit of 35 is exceeded, the longitudinal chromatic aberration remains under-corrected or the chromatic aberration of magnification remains over-corrected.

The next condition (2) is provided to define the shape of the third lens element L23. By the introduction of an aspheric surface on the air contact surface of the positive lens element (cemented lens element) on the object side of the second lens group, spherical aberrations are corrected to decrease the F-number. Still, as the lower limit of −0.4 to condition (2) is not reached, spherical aberrations are likely to occur. As the upper limit of 0.6 is exceeded, it is impossible to perfectly correct astigmatism even with the introduction of an aspheric surface in the first lens group.

As the lower limit of 0.3 to condition (3) is not reached, the exit pupil position comes close to the image plane, resulting in the likelihood of shading. As the upper limit of 0.9 is exceeded, it is difficult to ensure a compact zoom lens having high zoom ratios.

More preferably, at least one or all of the following conditions (1)', (2)' and (3)' should be satisfied.

$$2 < \nu_{23} - \nu_{24} < 32 \quad (1)'$$

$$-0.3 < (R_{23F} + R_{23R})/(R_{23F} - R_{23R}) < 0.5 \quad (2)'$$

$$0.35 < L/f_{2R} < 0.8 \quad (3)'$$

Most preferably, at least one or all of the following conditions (1)", (2)" and (3)" should be satisfied.

$$5 < \nu_{23} - \nu_{24} < 30 \qquad (1)''$$

$$-0.2 < (R_{23F} + R_{23R})/(R_{23F} - R_{23R}) < 0.4 \qquad (2)''$$

$$0.4 < L/f_{2R} < 0.7 \qquad (3)''$$

The zoom lens should preferably satisfy the following conditions (4), (5) and (6) with respect to the first lens element L21 and the second lens element L22 in the second lens group.

$$0.6 < R_{22R}/R_{21F} < 1.2 \qquad (4)$$

$$0.0 < L/R_{22F} < 0.8 \qquad (5)$$

$$0.01 < n_{22} - n_{21} < 0.2 \qquad (6)$$

Here $R_{21F}$ is the axial radius of curvature of the object side-surface of the first lens element L21 in the second lens group, $R_{22F}$ is the axial radius of curvature of the object side-cementing surface of the second lens element L22 in the second lens group, $R_{22R}$ is the axial radius of curvature of the image side-surface of the second lens element L22 in the second lens group, $n_{21}$ is the d-line refractive index of the medium of the first lens element L21 in the second lens group, and $n_{22}$ is the d-line refractive index of the medium of the second lens element L22 in the second lens group.

Referring generally to a zoom lens such as one constructed as herein contemplated, the focal length of the zoom lens where the composition magnification of the second and subsequent lens groups reaches −1 is obtained near the telephoto end; in the present invention, however, that is obtained substantially midway between the wide-angle end and the telephoto end, so that the first lens group is slimmed down. This causes the back focus to become somewhat long, and converging power to be centered on the surface located nearest to the object side of the second lens group (i.e., the object side-surface of the first lens element L21), and so much aberrations are likely to occur at that surface to such degrees that even with the introduction of an aspheric surface on the object side-surface of the first lens element L21 it is still difficult to make satisfactory correction for those aberrations. Although the aberrations are corrected at the second lens element L22, there are now some considerable aberrations ascribable to the sensitivity to decentration of the first and second lens elements L21 and L22, i.e., their relative decentration. It is thus preferable to cement together the first and second lens elements L21 and L22. If, in this case, aberrations are cancelled as much as possible between the first lens element L21 and the second lens element L22, it is then possible to decrease the relative sensitivity to decentration of the third lens element L23 and subsequent lens elements in the second lens group.

As the upper limit of 1.2 to condition (4) is exceeded, the effect of cementing on the slacking of decentration sensitivity becomes slender, and as the lower limit of 0.6 is not reached, the total power of cementing of the first and second lens elements L21 and L22 becomes weak, leading possibly to troubles with reducing the length of the lens system.

Condition (5), too, is provided regarding correction of longitudinal chromatic aberration and chromatic aberration of magnification. As the upper limit of 0.8 to condition (5) is exceeded, it is difficult to make correction for the longitudinal chromatic aberration although it is easy to reduce the thickness of doublets in the second lens group. Falling short of the lower limit of 0.0 may be favorable for correction of the chromatic aberration of magnification, but presents an obstacle to reducing the thickness of the lens system upon received in a lens mount because there is no option but to make the doublets thick.

Condition (6) is provided to define the difference in the index of refraction between the positive and negative lens elements in the front unit of the second lens group. Falling short of the lower limit of 0.01 may have an effect on diminishing the relative decentration sensitivity of the front unit (the first and second lens elements L21 and L22) and the rear unit (the third and fourth lens elements L23 and L24) in the second lens group; however, this makes overall correction of coma or the like difficult. Exceeding the upper limit of 0.2 may be beneficial for correction of each aberration all over the zooming range; however, this is unfavorable for improvements in the relative decentration sensitivity of the front and rear units in the second lens group.

More preferably, at least one or all of the following conditions (4)', (5)' and (6)' should be satisfied.

$$0.65 < R_{22R}/R_{21F} < 1.1 \qquad (4)'$$

$$0.05 < L/R_{22F} < 0.75 \qquad (5)'$$

$$0.02 < n_{22} - n_{21} < 0.15 \qquad (6)'$$

Most preferably, at least one or all of the following conditions (4)", (5)" and (6)" should be satisfied.

$$0.7 < R_{22R}/R_{21F} < 1.0 \qquad (4)''$$

$$0.1 < L/R_{22F} < 0.7 \qquad (5)''$$

$$0.03 < n_{22} - n_{21} < 0.1 \qquad (6)''$$

When an aspheric surface is introduced at a surface of a lens element in the second lens group, except the surfaces of the first and second lens elements L21 and L22, aberrations must be corrected at that aspheric surface without recourse to the strong diverging power of the image side-surface of the second lens element L22 so as to achieve compactness. Accordingly, there is an increase in the relative decentration sensitivity of the aspheric surface with respect to the third lens element L23 and subsequent lens elements in the second lens group. When some limitations are imposed on the amount of asphericity to avoid this, the merit of the aspheric surface introduced is impaired. Therefore, the third lens element L23 and the fourth lens element L24 should preferably be each composed of a spherical lens element alone. Whenever possible, the positive lens element L23 and the negative lens element L24 in the second lens group, too, should preferably be cemented together with the satisfaction of the following condition (7):

$$-0.9 < (R_{23F} + R_{24R})/(R_{23F} - F_{24R}) < 0.1 \qquad (7)$$

where $R_{23F}$ is the axial radius of curvature of the object side-surface of the third lens element L23 in the second lens group, and $R_{24R}$ is the axial radius of curvature of the image side-surface of the fourth lens element L24 in the second lens group.

Condition (7) is provided to define the shape factor after cementing of the third lens element L23 and the fourth lens element L24 in the second lens. Falling short of the lower limit of −0.9 may make it easy to narrow an axial air separation $d_{22}$ between the second lens element L22 and the third lens element L23; however, this renders correction of coma and astigmatism difficult. Exceeding the upper limit of 0.1 makes the air separation $d_{22}$ likely to become wide thanks to mechanical interference between the second lens element L22 and the third lens element L23, presenting an obstacle to diminishing the thickness of the lens system upon received in a lens mount More preferably, the following condition (7)' should be satisfied.

$$-0.8<(R_{23F}+R_{24R})/(R_{23F}-F_{24R})<0 \quad (7)'$$

Most preferably, the following condition (7)" should be satisfied.

$$-0.7<(R_{23F}+R_{24R})/(R_{23F}-F_{24R})<-0.1 \quad (7)''$$

Composed of one positive lens component, on the other hand, the third lens group should satisfy the following condition (8):

$$-0.1<(R_{3F}+R_{3R})/(R_{3F}-R_{3R})<1.5 \quad (8)$$

where $R_{3F}$ and $F_{3R}$ are the axial radii of curvature of the object side-surface and image side-surface of the positive lens component in the third lens group, respectively.

As the upper limit of 1.5 to condition (8) is exceeded, fluctuations of astigmatism with rear focusing become too much; even though astigmatism on an object point at infinity can be well corrected, astigmatism tends to become worse on a nearby object point. As the lower limit of −0.1 is not reached, fluctuations of astigmatism with rear focusing are reduced, but correction of aberrations on an object point at infinity becomes difficult.

More preferably, $$-0.05<(R_{3F}+R_{3R})/(R_{3F}-R_{3R})<1.3 \quad (8)'$$

Most preferably, $$-0<(R_{3F}+R_{3R})/(R_{3F}-R_{3R})<1.1 \quad (8)''$$

When the view of angle at the wide-angle end is smaller than 70°, it is acceptable that the third lens group is composed of one positive lens element. Since the third lens group moves on the optical axis for focusing, it is preferable to reduce the amount of asphericity introduced therein as much as possible or, whenever possible, it is preferable to compose the third lens group of a spherical lens element.

Composed of two lens elements, a negative lens element including an aspheric surface and a positive lens element, the first lens group should preferably satisfy the following conditions (9) and (10).

$$20<v_{11}-v_{12} \quad (9)$$

$$-10<(R_{13}+R_{14})/(R_{13}-R_{14})<-2.0 \quad (10)$$

Here $v_{11}$ is the d-line based Abbe number of the medium of the negative lens element in the first lens group, $v_{12}$ is the d-line based Abbe number of the medium of the positive lens element in the first lens group, $R_{13}$ is the axial radius of curvature of the object side-surface of the positive lens element in the first lens group, and $R_{14}$ is the axial radius of curvature of the image side-surface of the positive lens element in the first lens group.

Condition (9) is provided to define fluctuations of longitudinal chromatic aberration and chromatic aberration of magnification with zooming. As the lower limit of 20 is not reached, the fluctuations of longitudinal chromatic aberration and chromatic aberration of magnification tend to become large. Although there is practically no particular upper limit because of the absence of any more suitable medium, it is understood that the possible uppermost limit value of $v_{11}-v_{12}$ is 75. Lens materials exceeding the upper limit value of 75 cost much.

Condition (10) is provided to define the shape factor of the positive lens element in the first lens group. Being short of the lower limit of −10 is not only unfavorable for correction of astigmatism but is also disadvantageous in that the spacing between the first lens group and the second lens group must excessively be widened for avoidance of mechanical interferences during zooming. Exceeding the upper limit of −2.0 is unfavorable for correction of distortions.

More preferably, the following conditions (9)' and/or (10)' should be satisfied.

$$22<v_{11}-v_{12} \quad (9)'$$

$$-9<(R_{13}+R_{14})/(R_{13}-R_{14})<-2.0 \quad (10)'$$

Even more preferably, the following conditions (9)" or (10)" should be satisfied.

$$24<v_{11}-v_{12} \quad (9)''$$

$$-8<(R_{13}+R_{14})/(R_{13}-R_{14})<-2.5 \quad (10)''$$

Most preferably, both conditions (9)" and (10)" should be satisfied.

It is also preferable to satisfy the following condition (11):

$$0.2<d_{11}/L<0.65 \quad (11)$$

where $d_{11}$ is the axial air separation between the negative lens element and the positive lens element in the first lens group.

Exceeding the upper limit of 0.65 to condition (11) may be favorable for correction of coma, astigmatism and distortion, but causes the optical system to become bulky. As the lower limit of 0.2 is not reached, correction of these aberrations becomes difficult irrespective of the introduction of aspheric surfaces.

More preferably, $$0.25<d_{11}/L<0.6 \quad (11)'$$

Most preferably, $$0.3<d_{11}/L<0.55 \quad (11)''$$

As already explained, for reducing the fluctuations of aberrations with focusing it is preferable that the third lens group is constructed of a spherical lens element or with a reduced amount of asphericity. More specifically, the third lens group should satisfy the following condition (12).

$$0 \leq |Asp_{3MAX}|/|Asp_{2MAX}| \leq 0.5 \quad (12)$$

Here $Asp_{3MX}$ is the maximum amount of displacement of an aspheric surface with respect to a spherical surface of each refracting surface in the third lens group wherein said spherical surface has an axial radius of curvature, as measured at a height from the optical axis of the zoom lens wherein said height is located at a position that is 7/10 of the maximum radius value of the stop, and $Asp_{2MX}$ is the maximum amount of displacement of an aspheric surface with respect to a spherical surface of each refracting surface in the second lens group wherein said spherical surface has an axial radius of curvature, as measured at a height from the optical axis of the zoom lens wherein said height is located at a position that is 7/10 of the maximum radius value of the stop.

The lower limit to condition (12) is here set at zero that corresponds to the value at which all the surfaces in the third lens group are defined by spherical or planar surfaces; it is absolutely unlikely that the lower limit falls below zero. As the amount of displacement of the aspheric surface in the third lens group exceeds the upper limit of 0.5, fluctuations of aberrations with focusing become large.

It is noted that the "amount of displacement of the aspheric surface" used herein refers to the amount of displacement, as measured at a height from the optical axis wherein said height is located at a position that is 7/10 of the maximum radius value of the stop, of a certain aspheric surface with respect to a (reference) spherical surface having an axial radius of curvature (r), as shown in FIG. 9.

It is also noted that the values of condition (12) in Examples 1 to 3 given later are all zero. In the table concerning Examples 1 to 4 given later, the maximum stop diameter is provided wherein the shape of the stop is circular. In the present invention, the stop may be variable or fixed in shape.

The zoom lens of the present invention is favorable for setting up an electronic imaging system including a wide-angle area. In particular, the present invention is preferable for use on an electronic imaging system wherein the diagonal half angle of view, $\omega_w$, at the wide-angle end satisfies the following condition (this diagonal half angle of view is tantamount to the wide-angle-end half angle of view $\omega_w$ referred to in the examples given later):

$$27° < \omega_w < 42°$$

Being less than the lower limit of 27° to this condition or the wide-angle-end half angle of view becoming narrow is advantageous for correction of aberrations; however, this wide-angle-end half angle is no longer practical. As the upper limit of 42° is exceeded, on the other hand, distortion and chromatic aberration of magnification tend to occur and the number of lens elements increases.

With the zoom lens used on the electronic imaging system of the present invention, images clearly defined as far as their periphery are obtainable because off-axis chief rays can be guided to the image pickup device in a substantially vertical state. In order to make a sensible tradeoff between satisfactory image quality and size reductions, it is preferable that the diagonal length L of the effective image pickup area of the image pickup device is in the range of 3.0 mm to 12.0 mm.

When the lower limit of 3.0 mm is not reached or the image pickup device becomes too small, it is difficult to compensate for lack of sensitivity. As the upper limit of 12.0 mm is exceeded or the image pickup device becomes too large, the zoom lens can become unavoidably large, making the effect on thickness reductions slender.

Thus, the present invention provides the means for improving on the image-formation capability of the zoom lens portion while the thickness of the lens system is slimmed down upon received in a collapsible mount.

Next, how and why the thickness of filters is reduced is now explained. In an electronic imaging system, an infrared absorption filter having a certain thickness is usually inserted between an image pickup device and the object side of a zoom lens, so that the incidence of infrared light on the image pickup plane is prevented. Here consider the case where this filter is replaced by a coating devoid of thickness. In addition to the fact that the system becomes thin as a matter of course, there are spillover effects. When a near-infrared sharp cut coat having a transmittance ($\tau_{600}$) of at least 80% at 600 nm and a transmittance ($\tau_{700}$) of up to 8% at 700 nm is introduced between the image pickup device in the rear of the zoom lens system and the object side of the system, the transmittance at a near-infrared area of 700 nm or longer is relatively lower and the transmittance on the red side is relatively higher as compared with those of the absorption type, so that the tendency of bluish purple to turn into magenta—a defect of a CCD or other solid-state image pickup device having a complementary colors mosaic filter—is diminished by gain control and there can be obtained color reproduction comparable to that by a CCD or other solid-state image pickup device having a primary colors filter.

Thus, it is preferable to satisfy the following conditions (13) and (14):

$$\tau_{600}/\tau_{550} \geq 0.8 \tag{13}$$

$$\tau_{700}/\tau_{550} \leq 0.08 \tag{14}$$

where $\tau_{550}$ is the transmittance at 550 nm wavelength.

More preferably, the following conditions (13)' and/or (14)' should be satisfied:

$$\tau_{600}/\tau_{550} \geq 0.85 \tag{13}'$$

$$\tau_{700}/\tau_{550} \leq 0.05 \tag{14}'$$

Even more preferably, the following conditions (13)" or (14)" should be met:

$$\tau_{600}/\tau_{550} \geq 0.9 \tag{13}''$$

$$\tau_{700}/\tau_{550} \leq 0.03 \tag{14}''$$

Most preferably, both the following conditions (13)" and (14)" should be met:

$$\tau_{600}/\tau_{550} \geq 0.9 \tag{13}''$$

$$\tau_{700}/\tau_{550} \leq 0.03 \tag{14}''$$

Another defect of the CCD or other solid-state image pickup device is that the sensitivity to the wavelength of 550 nm in the near ultraviolet area is considerably higher than that of the human eye. This, too, makes noticeable chromatic blurring at the edges of an image due to chromatic aberrations in the near ultraviolet area. Such color blurring is fatal to a compact optical system. Accordingly, if an absorber or reflector is inserted on the optical path, which is designed such that the ratio of the transmittance ($\tau_{400}$) at 400 nm wavelength to that ($\tau_{550}$) at 550 nm wavelength is less than 0.08 and the ratio of the transmittance ($\tau_{440}$) at 440 nm wavelength to that ($\tau_{550}$) at 550 nm wavelength is greater than 0.4, it is then possible to considerably reduce noises such as chromatic blurring while the wavelength area necessary for color reproduction (satisfactory color reproduction) is kept intact.

It is thus preferable to satisfy the following conditions (15) and (16):

$$\tau_{400}/\tau_{550} \leq 0.08 \tag{15}$$

$$\tau_{440}/\tau_{550} \geq 0.4 \tag{16}$$

More preferably, the following conditions (15)' and/or (16)' should be satisfied.

$$\tau_{400}/\tau_{550} \leq 0.06 \tag{15}'$$

$$\tau_{440}/\tau_{550} \geq 0.5 \tag{16}'$$

Even more preferably, the following condition (15)" or (16)" should be satisfied.

$$\tau_{400}/\tau_{550} \leq 0.04 \tag{15}''$$

$$\tau_{440}/\tau_{550} \geq 0.6 \tag{16}''$$

Most preferably, both the following condition (15)″ and (16)″ should be satisfied.

$$\tau_{400}/\tau_{550} \leq 0.04 \quad (15)''$$

$$\tau_{440}/\tau_{550} \geq 0.6 \quad (16)''$$

It is noted that these filters should preferably be located between the image-formation optical system and the image pickup device.

On the other hand, a complementary colors filter is higher in substantial sensitivity and more favorable in resolution than a primary colors filter-inserted CCD due to its high transmitted light energy, and provides a great merit when used in combination with a small-size CCD. Regarding an optical low-pass filter that is another filter, too, its total thickness, $t_{LPF}$ in mm, should preferably satisfy the following condition (17):

$$0.15 < t_{LPF}/a < 0.45 \quad (17)$$

where $\underline{a}$ is the horizontal pixel pitch (in μm) of the image pickup device, and is equal to or below 5 μm.

Reducing the thickness of the optical low-pass filter, too, is effective for making the thickness of the zoom lens upon received in a collapsible mount; however, this is generally not preferred because the moiré preventive effect becomes slender. On the other hand, as the pixel pitch becomes small, the contrast of frequency components greater than Nyquist threshold decreases under the influence of diffraction of an image-formation lens system and, consequently, the decrease in the moiré preventive effect is more or less acceptable. For instance, it is known that when three different filters having crystallographic axes in directions where upon projected onto the image plane, the azimuth angle is horizontal (=0°) and ±45° are used while they are put one upon another, some moiré preventive effect is obtainable. According to the specifications known to make the filter assembly thinnest, each filter is displaced by $\underline{a}$ μm in the horizontal and by SQRT(½)*a μm in the ±45° directions. Here SQRT means a square root. The then filter thickness is approximately given by [1+2*SQRT(½)]*a/5.88 (mm). This is the specification where the contrast is reduced down to zero at a frequency corresponding just to Nyquist threshold. At a thickness a few % to a few tens of % smaller than this, a little more contrast of the frequency corresponding to Nyquist threshold appears; however, this can be suppressed under the influence of the aforesaid diffraction.

In other filter embodiments where two filters are placed one upon another or one single filter is used, too, it is preferable to satisfy condition (17). When the upper limit of 0.45 is exceeded, the optical low-pass filter becomes too thick, contrary to size reduction requirements. When the lower limit of 0.15 is not reached, moiré removal becomes insufficient. In this condition, $\underline{a}$ should be 5 μm or less.

When $\underline{a}$ is 4 μm or less or where the optical low-pass filter is more susceptible to diffraction, it is preferable that $$0.13 < t_{LPF}/a < 0.42 \quad (17)'$$

Depending on the number of low-pass filters put on the horizontal pixel pitch, it is also acceptable to satisfy the following condition (17)″:

$$0.3 < t_{LPF}/a < 0.4 \quad (17)''$$

provided that three filters are placed one upon another and 4≦a<5 μm, 0.2<$t_{LPF}$/a<0.28 provided that two filters are placed one upon another and 4≦a<5 μm 0.1<$t_{LPF}$/a<0.16 provided that only one filter is used and 4≦a<5 μm, 0.25<$t_{LPF}$/a<0.37 provided that three filters are placed one upon another and a<4 μm, 0.16<$t_{LPF}$/a<0.25 provided that two filters are placed one upon another and a<4 μm, and 0.08<$t_{LPF}$/a<0.14 provided that one filter is used and a<4 μm.

When an image pickup device having a small pixel pitch is used, there is degradation in image quality under the influence of diffraction effect by stop-down. In this case, the electronic image pickup system is designed in such a way as to have a plurality of apertures each of fixed aperture size, one of which can be inserted into any one of optical paths between the lens surface located nearest to the image side of the first lens group and the lens surface located nearest to the object side of the third lens group and can be replaced with another as well, so that illuminance on the image plane can be adjusted. Then, media whose transmittances with respect to 550 nm are different but less than 80% are filled in some of the plurality of apertures for light quantity control. Alternatively, when control is carried out in such a way as to provide a light quantity corresponding to such an F-number as given by $\underline{a}$ (μm)/F-number<4.0, it is preferable to fill the apertures with medium whose transmittance with respect to 550 nm are different but less than 80%. In the range of the full-aperture value to values deviating from the aforesaid condition as an example, any medium is not used or dummy media having a transmittance of at least 91% with respect to 550 nm are used. In the range of the aforesaid condition, it is preferable to control the quantity of light with an ND filter or the like, rather than to decrease the diameter of the aperture stop to such an extent that the influence of diffraction appears.

Alternatively, it is acceptable to uniformly reduce the diameters of a plurality of apertures inversely with the F-numbers, so that optical low-pass filters having different frequency characteristics can be inserted in place of ND filters. As degradation by diffraction becomes worse with stop-down, it is desirable that the smaller the aperture diameter, the higher the frequency characteristics the optical low-pass filters have.

Still other objects and advantages of the invention will in part be obvious and will in part be apparent from the specification.

The invention accordingly comprises the features of construction, combinations of elements, and arrangement of parts that will be exemplified in the construction hereinafter set forth, and the scope of the invention will be indicated in the claims.

DESCRIPTION OF THE PREFERRED EMBODIMENTS

Examples 1 to 4 of the zoom lens used with the electronic imaging system of the invention are now explained. Sectional lens configurations of these examples at the wide-angle end (a), in the intermediate state (b) and at the telephoto end (c) upon focused on an object point at infinity are shown in FIGS. 1 through 4 wherein G1 represents a first lens group, S a stop, G2 a second lens group, G3 a third lens group, IF an infrared cut absorption filter, LF a low-pass filter, CG a cover glass for a CCD that is an electronic image pickup device located on the image plane, and I the image plane of CCD. Instead of the infrared cut absorption filter IF, it is acceptable to use a transparent plane plate with a near-infrared sharp cut coat applied on the entrance surface or a low-pass filter LF that is directly provided with a near-infrared sharp cut coat.

EXAMPLE 1

Figure 1A:
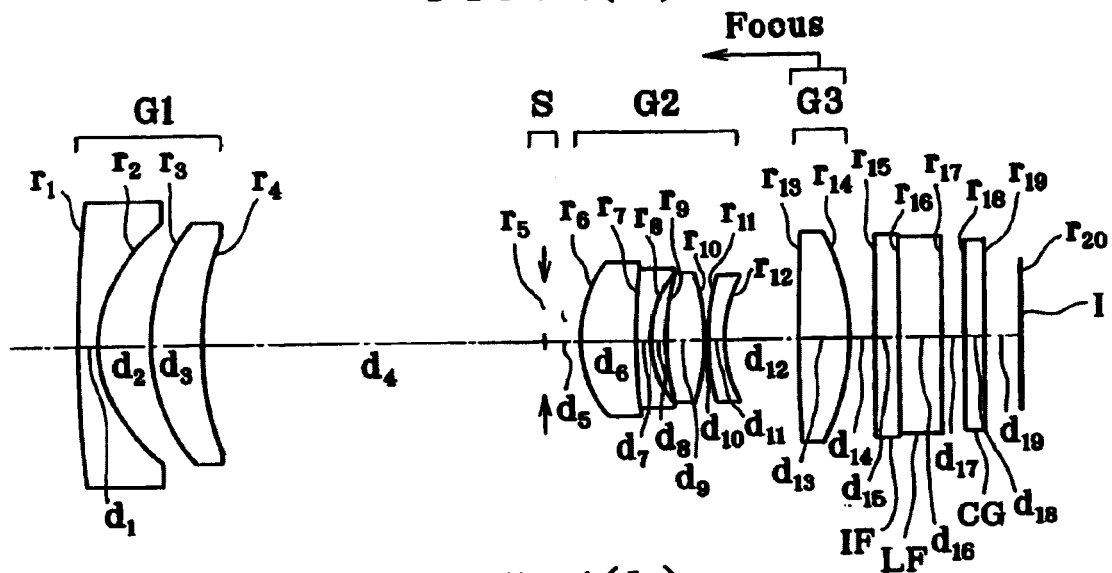
FIGS. 1(a), 1(b) and 1(c) are sections in schematic illustrative of Example 1 of the zoom lens used with the electronic imaging system of the invention at the wide-angle end (a), in an intermediate state (b) and at the telephoto end (c), respectively, when the zoom lens is focused on an object point at infinity.
Figure 1B:
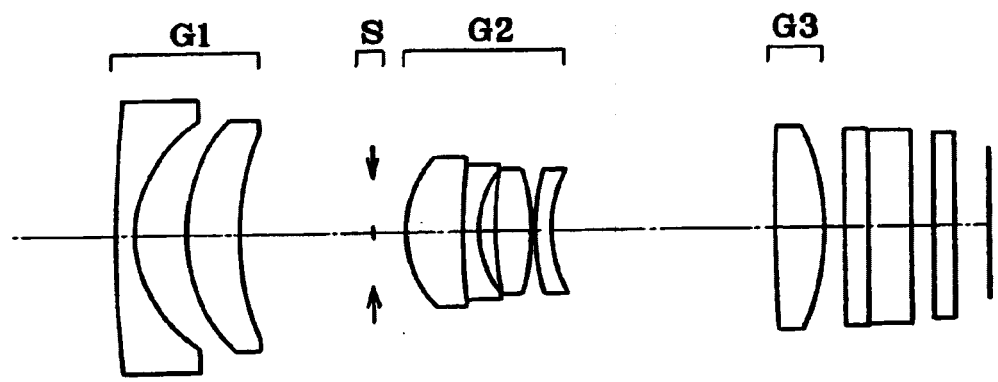
Figure 1C:
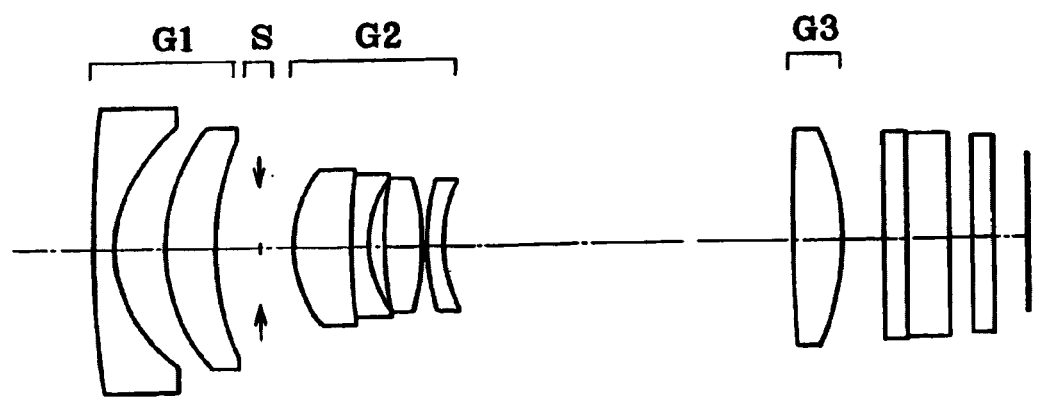

As shown in FIGS. 1(a), 1(b) and 1(c), Example 1 is directed to a zoom lens made up of a first lens group G1 having negative refracting power and composed of a negative meniscus lens element convex on its object side and a positive meniscus lens element convex on its object side, an aperture stop S, a second lens group G2 having positive refracting power and composed of a doublet consisting of a positive meniscus lens element convex on its object side and a negative meniscus lens element convex on its object side, a double-convex lens element and a negative meniscus lens element convex on its object side, and a third lens group G3 having positive refracting power and composed of one double-convex positive lens element. Upon zooming from the wide-angle end to the telephoto end of the zoom lens, the first lens group G1 moves toward the object side of the zoom lens in a concave locus, and is located slightly nearer to the image plane side of the zoom lens at the telephoto end than at the wide-angle end, the second lens group G2 moves together with the aperture stop S toward the object side, and the third lens group G3 moves toward the image plane side in a convex locus and is located nearer to the object side at the telephoto end than at the wide-angle end. For focusing on a nearby subject, the third lens group G3 moves toward the object side.

Two aspheric surfaces are used; one at the image plane side-surface of the negative meniscus lens element in the first lens group G1 and another at the object side-surface of the doublet in the second lens group G2.

EXAMPLE 2

Figure 2A:
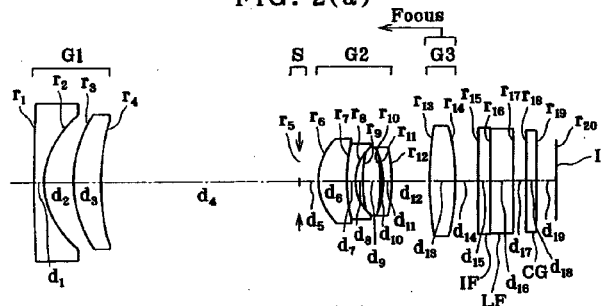
FIGS. 2(a), 2(b) and 2(c) are sections in schematic illustrative of Example 2 of the zoom lens, similar to FIGS. 1(a) to 1(c).
Figure 2B:
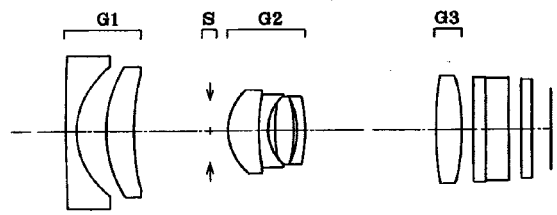
Figure 2C:
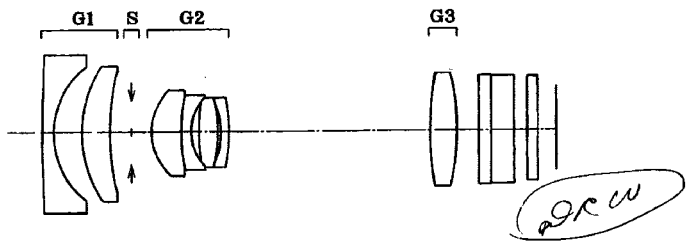

As shown in FIGS. 2(a), 2(b) and 2(c), Example 2 is directed to a zoom lens made up of a first lens group G1 having negative refracting power and composed of a negative meniscus lens element convex on its object side and a positive meniscus lens element convex on its object side, an aperture stop S, a second lens group G2 having positive refracting power and composed of a doublet consisting of a double-convex positive lens element and a negative meniscus lens element convex on its image plane side, a double-convex positive lens element and a negative meniscus lens element convex on its image plane side, and a third lens group G3 composed of one double-convex positive lens element and having positive refracting power. Upon zooming from the wide-angle end to the telephoto end of the zoom lens, the first lens group G1 moves toward the object side of the zoom lens in a concave locus and is positioned slightly nearer to the image plane side of the zoom lens at the telephoto end than the wide-angle end, the second lens group G2 moves together with the aperture stop S toward the object side, and the third lens group G3 moves toward the image plane side in a convex locus and is positioned slightly nearer to the image plane side at the telephoto end than at the wide-angle end. For focusing on a nearby subject, the third lens group G3 moves toward the object side.

Two aspheric surfaces are used; one at the image plane side-surface of the negative meniscus lens element in the first lens group G1 and another at the object side-surface of the doublet in the second lens group G2.

EXAMPLE 3

Figure 3A:
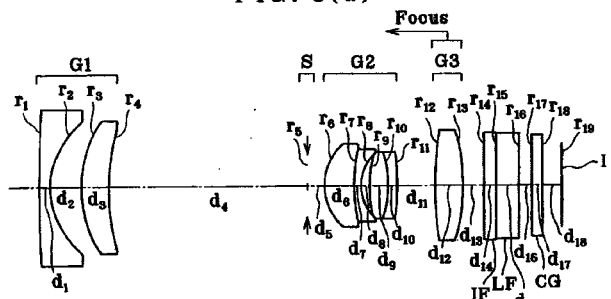
FIGS. 3(a), 3(b) and 3(c) are sections in schematic illustrative of Example 3 of the zoom lens, similar to FIGS. 1(a) to 1(c).
Figure 3B:
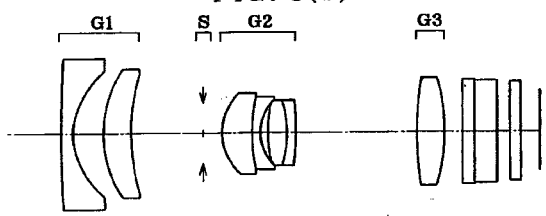
Figure 3C:
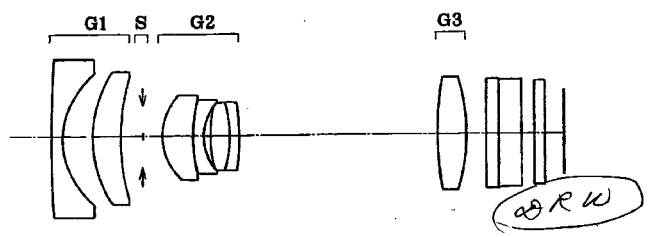

As shown in FIGS. 3(a), 3(b) and 3(c), Example 3 is directed to a zoom lens made up of a first lens group G1 having negative refracting power and composed of a negative meniscus lens element convex on its object side and a positive meniscus lens element convex on its object side, an aperture stop S, a second lens group G2 having positive refracting power and composed of a doublet consisting of a positive meniscus lens element convex on its object side and a negative meniscus lens element convex on its object side and a doublet consisting of a double-convex positive lens element and a negative meniscus lens element convex on its image plane side, and a third lens group G3 composed of one double-convex positive lens element and having positive refracting power. Upon zooming from the wide-angle end to the telephoto end of the zoom lens, the first lens group G1 moves toward the object side of the zoom lens in a concave locus and is positioned slightly nearer to the image plane side of the zoom lens at the telephoto end than at the wide-angle end, the second lens group G2 moves together with the aperture stop S toward the object side, and the third lens group G3 moves toward the image plane side in a convex locus. For focusing on a nearby subject, the third lens group G3 moves toward the object side.

Two aspheric surfaces are used; one at the image plane side-surface of the negative meniscus lens element in the first lens group G1 and another at the object side-surface of the object-side doublet in the second lens group G2.

EXAMPLE 4

Figure 4A:
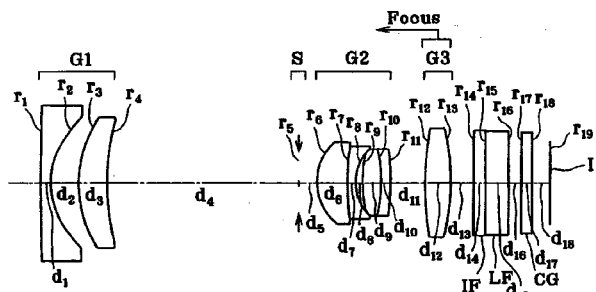
FIGS. 4(a), 4(b) and 4(c) are sections in schematic illustrative of Example 4 of the zoom lens, similar to FIGS. 1(a) to 1(c).
Figure 4B:
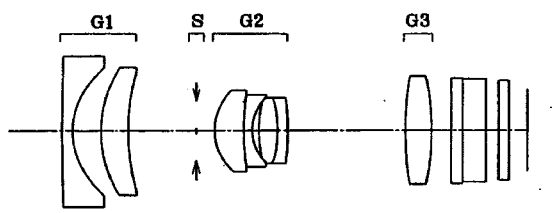
Figure 4C:
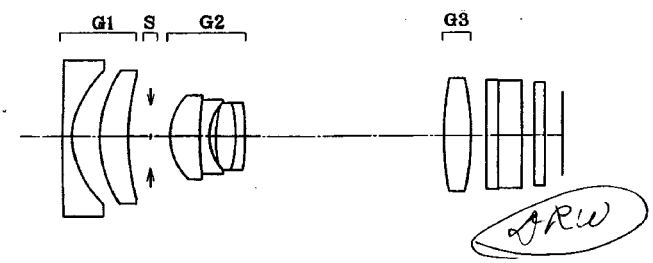
Figure 5A:
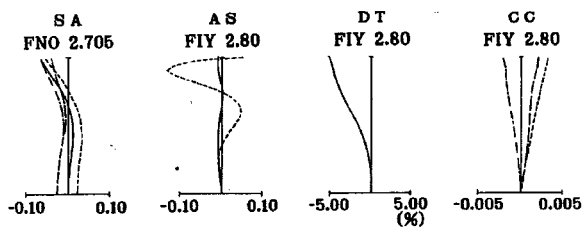
FIGS. 5(a), 5(b) and 5(c) are aberration diagrams of Example 1 upon focused on an object point at infinity.
Figure 5B:
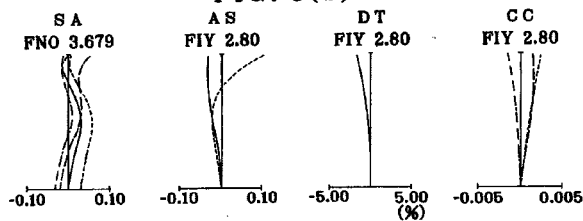
Figure 5C:
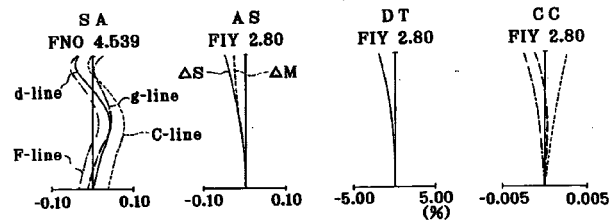
Figure 6A:
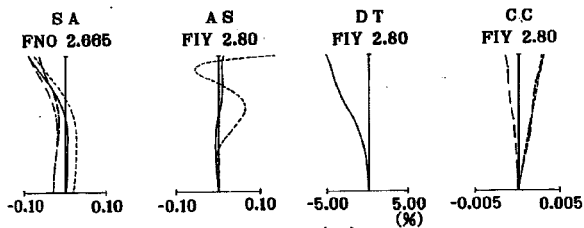
FIGS. 6(a), 6(b) and 6(c) are aberration diagrams of Example 1 upon focused at a subject distance of 10 cm.
Figure 6B:
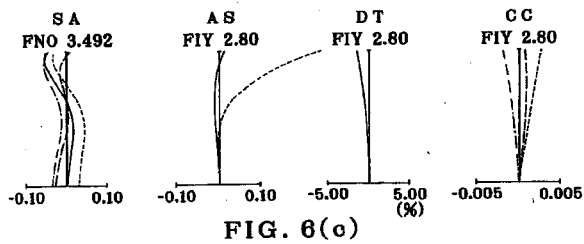
Figure 6C:
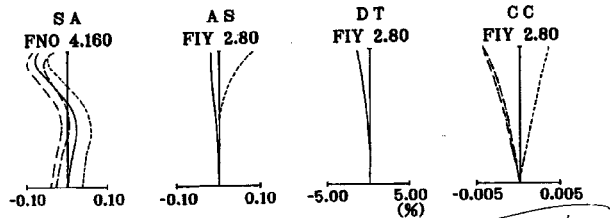
Figure 7A:
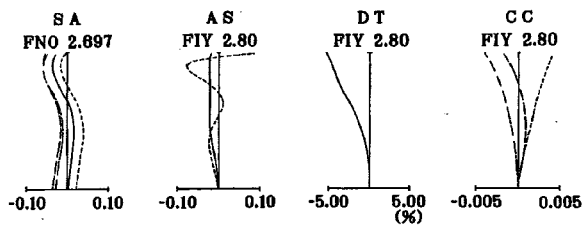
FIGS. 7(a), 7(b) and 7(c) are aberration diagrams of Example 3 upon focused on an object point at infinity.
Figure 7B:
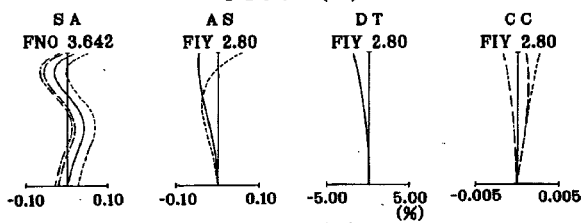
Figure 7C:
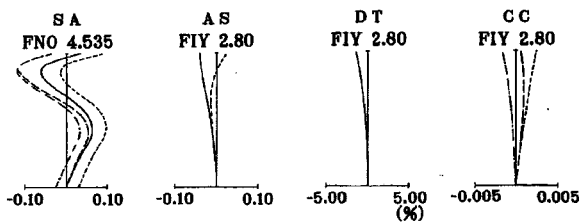
Figure 8A:
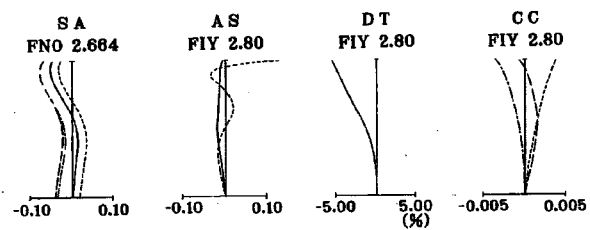
FIGS. 8(a), 8(b) and 8(c) are aberration diagrams of Example 3 upon focused at a subject distance of 10 cm.
Figure 8B:
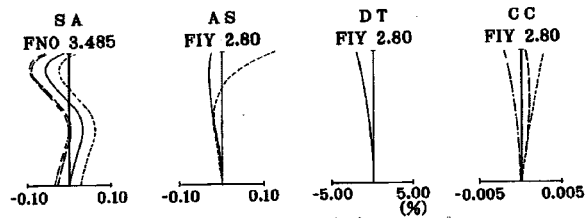
Figure 8C:
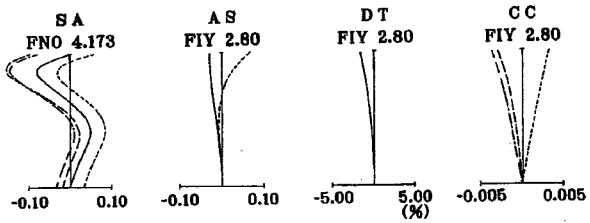
Figure 9:
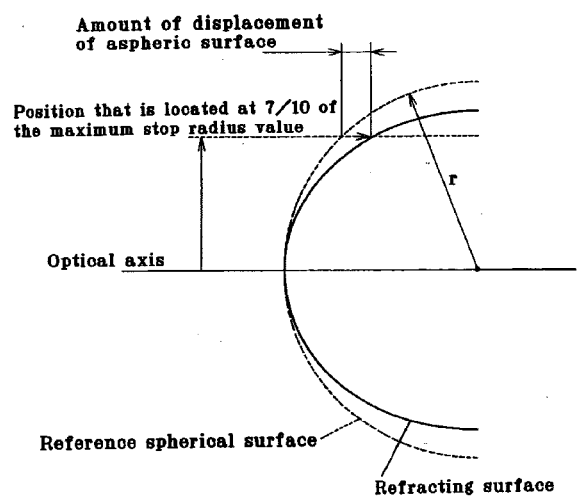
FIG. 9 is illustrative of the definition of the amount of displacement of an aspheric surface according to the invention.

As shown in FIGS. 4(*a*), 4(*b*) and 4(*c*), Example 4 is directed to a zoom lens made up of a first lens group G1 having negative refracting power and composed of a negative meniscus lens element convex on its object side and a positive meniscus lens element convex on its object side, an aperture stop S, a second lens group G2 having positive refracting power and composed of a doublet consisting of a positive meniscus lens element convex on its object side and a negative meniscus lens element convex on its object side and a doublet consisting of a double-convex positive lens element and a negative meniscus lens element convex on its image plane side, and a third lens group G3 composed of one double-convex positive lens element and having positive refracting power. Upon zooming from the wide-angle end to the telephoto end of the zoom lens, the first lens group G1 moves toward the object side of the zoom lens in a concave locus and is positioned slightly nearer to the image plane side of the zoom lens at the telephoto end than at the wide-angle end, the second lens group G2 moves together with the aperture stop S toward the object side, and the third lens group G3 moves toward the image plane side. For focusing on a nearby subject, the third lens group G3 moves toward the object side.

Three aspheric surfaces are used; one at the image plane side-surface of the negative meniscus lens element in the first lens group G1, one at the object side-surface of the object-side doublet in the second lens group G2 and one at the image plane side-surface of the double-convex positive lens element in the third lens group G3.

The numerical data on each example are given below. Symbols used hereinafter but not hereinbefore have the following meanings:

f: focal length of the zoom lens
$F_{NO}$: F-number
ω: half angle of view
WE: wide-angle end
ST intermediate state
TE: telephoto end
$r_1, r_2, \ldots$: radius of curvature of each lens surface
$d_1, d_2, \ldots$: spacing between the adjacent lens surface
$n_{d1}, n_{d2}, \ldots$: d-line refractive index of each lens element
$v_{d1}, v_{d2}, \ldots$: Abbe number of each lens element Here let x be an optical axis on condition that the direction of propagation of light is positive and y be a direction perpendicular to the optical axis. Then, aspheric configuration is given by $$x = (y^2/r)/[1+\{1-(K+1)(y/r)^2\}^{1/2}] + A_4 y^4 + A_6 y^6 + A_8 y^8 + A_{10} y^{10}$$

where r is a paraxial radius of curvature, K is a conical coefficient, and $A_4$, $A_6$, $A_8$ and $A_{10}$ are the fourth, sixth, eighth and tenth aspheric coefficients, respectively.

Example 1

| | | | |
|---|---|---|---|
| $r_1 = 49.3332$ | $d_1 = 0.7000$ | $n_{d1} = 1.74320$ | $v_{d1} = 49.34$ |
| $r_2 = 4.5702$(Aspheric) | $d_2 = 1.8365$ | | |
| $r_3 = 6.6819$ | $d_3 = 1.8000$ | $n_{d2} = 1.84666$ | $v_{d2} = 23.78$ |
| $r_4 = 10.1396$ | $d_4 = $ (Variable) | | |
| $r_5 = \infty$ (Stop) | $d_5 = 1.2000$ | | |
| $r_6 = 4.2027$(Aspheric) | $d_6 = 2.0000$ | $n_{d3} = 1.80610$ | $v_{d3} = 40.92$ |
| $r_7 = 25.0000$ | $d_7 = 0.6000$ | $n_{d4} = 1.84666$ | $v_{d4} = 23.78$ |
| $r_8 = 3.9717$ | $d_8 = 0.5000$ | | |
| $r_9 = 11.5202$ | $d_9 = 1.3000$ | $n_{d5} = 1.77250$ | $v_{d5} = 49.60$ |
| $r_{10} = -9.9597$ | $d_{10} = 0.1500$ | | |
| $r_{11} = 8.1954$ | $d_{11} = 0.6000$ | $n_{d6} = 1.80610$ | $v_{d6} = 40.92$ |
| $r_{12} = 4.9446$ | $d_{12} = $ (Variable) | | |
| $r_{13} = 80.8681$ | $d_{13} = 1.8000$ | $n_{d7} = 1.48749$ | $v_{d7} = 70.23$ |
| $r_{14} = -9.1775$ | $d_{14} = $ (Variable) | | |
| $r_{15} = \infty$ | $d_{15} = 0.8000$ | $n_{d8} = 1.51633$ | $v_{d8} = 64.14$ |
| $r_{16} = \infty$ | $d_{16} = 1.5000$ | $n_{d9} = 1.54771$ | $v_{d9} = 62.84$ |
| $r_{17} = \infty$ | $d_{17} = 0.8000$ | | |
| $r_{18} = \infty$ | $d_{18} = 0.7500$ | $n_{d10} = 1.51633$ | $v_{d10} = 64.14$ |
| $r_{19} = \infty$ | $d_{19} = 1.2073$ | | |
| $r_{20} = \infty$ (Image Plane) | | | |

| Aspherical Coefficients |
|---|
| 2 nd surface |
| $K = 0$<br>$A_4 = -7.2606 \times 10^{-4}$<br>$A_6 = 1.9216 \times 10^{-5}$<br>$A_8 = -4.0279 \times 10^{-6}$<br>$A_{10} = 0.0000$ |
| 6 th surface |
| $K = 0$<br>$A_4 = -1.1754 \times 10^{-3}$<br>$A_6 = 2.6952 \times 10^{-6}$<br>$A_8 = -4.5961 \times 10^{-6}$<br>$A_{10} = 0.0000$ |

| Zooming Data (∞) | | | |
|---|---|---|---|
| | WE | ST | TE |
| f (mm) | 4.56328 | 8.69928 | 12.88225 |
| $F_{NO}$ | 2.7046 | 3.6789 | 4.5389 |
| ω (°) | 32.9 | 18.1 | 12.5 |
| $d_4$ | 12.04469 | 4.61703 | 1.50000 |
| $d_{12}$ | 2.53628 | 7.84153 | 12.31026 |
| $d_{14}$ | 0.92173 | 0.68996 | 1.40164 |

Example 2

| | | | |
|---|---|---|---|
| $r_1 = 141.2587$ | $d_1 = 0.7000$ | $n_{d1} = 1.74320$ | $v_{d1} = 49.34$ |
| $r_2 = 4.8545$(Aspheric) | $d_2 = 1.9743$ | | |
| $r_3 = 8.4474$ | $d_3 = 1.8000$ | $n_{d2} = 1.84666$ | $v_{d2} = 23.78$ |
| $r_4 = 16.0102$ | $d_4 = $ (Variable) | | |
| $r_5 = \infty$ (Stop) | $d_5 = 1.2000$ | | |
| $r_6 = 3.7098$(Aspheric) | $d_6 = 2.0000$ | $n_{d3} = 1.80610$ | $v_{d3} = 40.92$ |
| $r_7 = 12.5000$ | $d_7 = 0.6000$ | $n_{d4} = 1.84666$ | $v_{d4} = 23.78$ |
| $r_8 = 3.0510$ | $d_8 = 0.5000$ | | |
| $r_9 = 9.8905$ | $d_{d9} = 1.3000$ | $n_{d5} = 1.77250$ | $v_{d5} = 49.60$ |
| $r_{10} = -8.5614$ | $d_{10} = 0.1500$ | | |
| $r_{11} = -5.6902$ | $d_{11} = 0.6000$ | $n_{d6} = 1.80610$ | $v_{d6} = 40.92$ |
| $r_{12} = -10.3386$ | $d_{12} = $ (Variable) | | |
| $r_{13} = 21.8218$ | $d_{13} = 1.8000$ | $n_{d7} = 1.48749$ | $v_{d7} = 70.23$ |
| $r_{14} = -14.9472$ | $d_{14} = $ (Variable) | | |

-continued

| | | | |
|---|---|---|---|
| $r_{15} = \infty$ | $d_{15} = 0.8000$ | $n_{d8} = 1.51633$ | $\nu_{d8} = 64.14$ |
| $r_{16} = \infty$ | $d_{16} = 1.5000$ | $n_{d9} = 1.54771$ | $\nu_{d9} = 62.84$ |
| $r_{17} = \infty$ | $d_{17} = 0.8000$ | | |
| $r_{18} = \infty$ | $d_{18} = 0.7500$ | $n_{d10} = 1.51633$ | $\nu_{d10} = 64.14$ |
| $r_{19} = \infty$ | $d_{19} = 1.2099$ | | |
| $r_{20} = \infty$ (Image Plane) | | | |

Aspherical Coefficients 2 nd surface $K = 0$
$A_4 = -9.2078 \times 10^{-4}$
$A_6 = 1.4190 \times 10^{-5}$
$A_8 = -2.8195 \times 10^{-6}$
$A_{10} = 0.0000$ 6 th surface $K = 0$
$A_4 = -7.0100 \times 10^{-4}$
$A_6 = -1.0177 \times 10^{-5}$
$A_8 = -7.0972 \times 10^{-6}$
$A_{10} = 0.0000$ Zooming Data ($\infty$)

| | WE | ST | TE |
|---|---|---|---|
| f (mm) | 4.51002 | 8.68798 | 12.89746 |
| $F_{NO}$ | 2.6761 | 3.6855 | 4.5237 |
| $\omega$ (°) | 33.2 | 18.2 | 12.4 |
| $d_4$ | 12.99650 | 4.99560 | 1.50000 |
| $d_{12}$ | 2.42755 | 8.73584 | 13.45654 |
| $d_{14}$ | 1.39955 | 0.70522 | 1.39450 |

Example 3

| | | | |
|---|---|---|---|
| $r_1 = 103.3736$ | $d_1 = 0.7000$ | $n_{d1} = 1.74320$ | $\nu_{d1} = 49.34$ |
| $r_2 = 4.9954$(Aspheric) | $d_2 = 1.9854$ | | |
| $r_3 = 8.1655$ | $d_3 = 1.8000$ | $n_{d2} = 1.84666$ | $\nu_{d2} = 23.78$ |
| $r_4 = 14.0441$ | $d_4 = $ (Variable) | | |
| $r_5 = \infty$ (Stop) | $d_5 = 1.2000$ | | |
| $r_6 = 3.6266$(Aspheric) | $d_6 = 2.0000$ | $n_{d3} = 1.74320$ | $\nu_{d3} = 49.34$ |
| $r_7 = 10.0000$ | $d_7 = 0.6000$ | $n_{d4} = 1.80100$ | $\nu_{d4} = 34.97$ |
| $r_8 = 3.0961$ | $d_8 = 0.5000$ | | |
| $r_9 = 9.9430$ | $d_9 = 1.3000$ | $n_{d5} = 1.77250$ | $\nu_{d5} = 49.60$ |
| $r_{10} = -7.0000$ | $d_{10} = 0.6000$ | $n_{d6} = 1.84666$ | $\nu_{d6} = 23.78$ |
| $r_{11} = -22.8619$ | $d_{11} = $ (Variable) | | |
| $r_{12} = 22.8585$ | $d_{12} = 1.8000$ | $n_{d7} = 1.48749$ | $\nu_{d7} = 70.23$ |
| $r_{13} = -14.2847$ | $d_{13} = $ (Variable) | | |
| $r_{14} = \infty$ | $d_{14} = 0.8000$ | $n_{d8} = 1.51633$ | $\nu_{d8} = 64.14$ |
| $r_{15} = \infty$ | $d_{15} = 1.5000$ | $n_{d9} = 1.54771$ | $\nu_{d9} = 62.84$ |
| $r_{16} = \infty$ | $d_{16} = 0.8000$ | | |
| $r_{17} = \infty$ | $d_{17} = 0.7500$ | $n_{d10} = 1.51633$ | $\nu_{d10} = 64.14$ |
| $r_{18} = \infty$ | $d_{18} = 1.2105$ | | |
| $r_{19} = \infty$ (Image Plane) | | | |

Aspherical Coefficients 2 nd surface $K = 0$
$A_4 = -7.8016 \times 10^{-4}$
$A_6 = 9.9584 \times 10^{-6}$
$A_8 = -2.1487 \times 10^{-6}$
$A_{10} = 0.0000$ 6 th surface $K = 0$
$A_4 = -1.1067 \times 10^{-3}$
$A_6 = 1.8539 \times 10^{-5}$
$A_8 = -1.2280 \times 10^{-5}$
$A_{10} = 0.0000$ Zooming Data ($\infty$)

| | WE | ST | TE |
|---|---|---|---|
| f (mm) | 4.51654 | 8.69308 | 12.89427 |
| $F_{NO}$ | 2.6966 | 3.6424 | 4.5346 |
| $\omega$ (°) | 33.2 | 18.2 | 12.4 |
| $d_4$ | 13.04719 | 4.68301 | 1.50000 |
| $d_{11}$ | 2.50132 | 8.23787 | 13.41197 |
| $d_{13}$ | 1.42171 | 1.17172 | 1.39082 |

Example 4

| | | | |
|---|---|---|---|
| $r_1 = 142.2438$ | $d_1 = 0.7000$ | $n_{d1} = 1.74320$ | $\nu_{d1} = 49.34$ |
| $r_2 = 5.0719$(Aspheric) | $d_2 = 1.8861$ | | |
| $r_3 = 8.4186$ | $d_3 = 1.8000$ | $n_{d2} = 1.84666$ | $\nu_{d2} = 23.78$ |
| $r_4 = 15.1677$ | $d_4 = $ (Variable) | | |
| $r_5 = \infty$ (Stop) | $d_5 = 1.2000$ | | |
| $r_6 = 3.6066$(Aspheric) | $d_6 = 2.0000$ | $n_{d3} = 1.74320$ | $\nu_{d3} = 49.34$ |
| $r_7 = 15.0000$ | $d_7 = 0.6000$ | $n_{d4} = 1.80100$ | $\nu_{d4} = 34.97$ |
| $r_8 = 3.0941$ | $d_8 = 0.5000$ | | |
| $r_9 = 10.1001$ | $d_9 = 1.3000$ | $n_{d5} = 1.77250$ | $\nu_{d5} = 49.60$ |
| $r_{10} = -7.0000$ | $d_{10} = 0.6000$ | $n_{d6} = 1.84666$ | $\nu_{d6} = 23.78$ |
| $r_{11} = -21.2519$ | $d_{11} = $ (Variable) | | |
| $r_{12} = 19.9825$ | $d_{12} = 1.8000$ | $n_{d7} = 1.48749$ | $\nu_{d7} = 70.23$ |
| $r_{13} = -15.6300$ (Aspheric) | $d_{13} = $ (Variable) | | |
| $r_{14} = \infty$ | $d_{14} = 0.8000$ | $n_{d8} = 1.51633$ | $\nu_{d8} = 64.14$ |
| $r_{15} = \infty$ | $d_{15} = 1.5000$ | $n_{d9} = 1.54771$ | $\nu_{d9} = 62.84$ |
| $r_{16} = \infty$ | $d_{16} = 0.8000$ | | |
| $r_{17} = \infty$ | $d_{17} = 0.7500$ | $n_{d10} = 1.51633$ | $\nu_{d10} = 64.14$ |
| $r_{18} = \infty$ | $d_{18} = 1.2098$ | | |
| $r_{19} = \infty$ (Image Plane) | | | |

Aspherical Coefficients 2 nd surface $K = 0$
$A_4 = -7.6649 \times 10^{-4}$
$A_6 = 6.5573 \times 10^{-6}$
$A_8 = -1.8311 \times 10^{-6}$
$A_{10} = 0.0000$ 6th surface $K = 0$
$A_4 = -1.0316 \times 10^{-3}$
$A_6 = -2.0895 \times 10^{-5}$
$A_8 = -8.5826 \times 10^{-6}$
$A_{10} = 0.0000$ 13 th surface $K = 0$
$A_4 = 5.0482 \times 10^{-5}$
$A_6 = -1.2128 \times 10^{-5}$
$A_8 = 3.1814 \times 10^{-7}$
$A_{10} = 0.0000$ Zooming Data ($\infty$)

| | WE | ST | TE |
|---|---|---|---|
| f (mm) | 4.51419 | 8.68988 | 12.89476 |
| $F_{NO}$ | 2.6521 | 3.5702 | 4.5000 |
| $\omega$ (°) | 33.3 | 18.2 | 12.5 |
| $d_4$ | 12.84566 | 4.45276 | 1.50000 |
| $d_{11}$ | 2.30037 | 7.93048 | 13.42110 |
| $d_{13}$ | 1.42364 | 1.21243 | 0.99032 |

The aberration diagrams of Example 1 upon focused on an object point at infinity and at a substance distance of 10 cm are shown in FIGS. 5(a) to 5(c) and 6(a) to 6(c), and the aberration diagrams of Example 3 in FIGS. 7(a) to 7(c) and 8(a) to 8(c). In these diagrams, (a), (b) and (c) show spherical aberrations SA, astigmatism AS, distortion DT and chromatic aberration of magnification CC at the wide-angle end, in an intermediate state and at the telephoto end, respectively. "FIY" stands for an image height.

Tabulated below are the values of conditions (1) to (11) and (13) to (17) as well as the values of $Asp_{2MAX}$, $Asp_{3MAX}$, maximum stop diameter $\phi$ and L with respect to condition (12).

| Examples | 1 | 2 | 3 | 4 |
|---|---|---|---|---|
| (1) | 8.68000 | 8.68000 | 25.82000 | 25.82000 |
| (2) | 0.07265 | 0.07203 | 0.17370 | 0.18129 |
| (3) | 0.52227 | 0.58140 | 0.57014 | 0.57808 |
| (4) | 0.94503 | 0.82242 | 0.85373 | 0.85790 |
| (5) | 0.22400 | 0.44800 | 0.56000 | 0.37333 |
| (6) | 0.04056 | 0.04056 | 0.05780 | 0.05780 |
| (7) | — | — | −0.39381 | −0.35570 |
| (8) | 0.79616 | 0.18697 | 0.23083 | 0.12222 |
| (9) | 25.56000 | 25.56000 | 25.56000 | 25.56000 |
| (10) | −4.86491 | −3.23392 | −3.77802 | −3.49471 |
| (11) | 0.32795 | 0.35256 | 0.35453 | 0.33680 |
| (13) | 1.0 | 1.0 | 1.0 | 1.0 |
| (14) | 0.04 | 0.04 | 0.04 | 0.04 |
| (15) | 0.0 | 0.0 | 0.0 | 0.0 |
| (16) | 1.06 | 1.06 | 1.06 | 1.06 |
| (17) | 0.333 | 0.333 | 0.333 | 0.333 |
|  | (a = 3.0) | (a = 3.0) | (a = 3.0) | (a = 3.0) |
| $Asp_{2MAX}$ | −0.00438 | −0.00326 | −0.00447 | −0.00443 |
| $Asp_{3MAX}$ | 0 | 0 | 0 | +0.00011 |
| $\phi$ | 3.96 | 4.12 | 4.04 | 4.04 |
| L | 5.6 | 5.6 | 5.6 | 5.6 |

It is noted that in Examples 1 to 4, the low-pass filter LF has a total thickness of 1.500 mm and a triple-layer structure. It is also appreciated that many modifications may be made to the aforesaid examples without departing from the scope of the invention. For instance, the low-pass filter LF may be formed of one single low-pass filter element.

Figure 10:
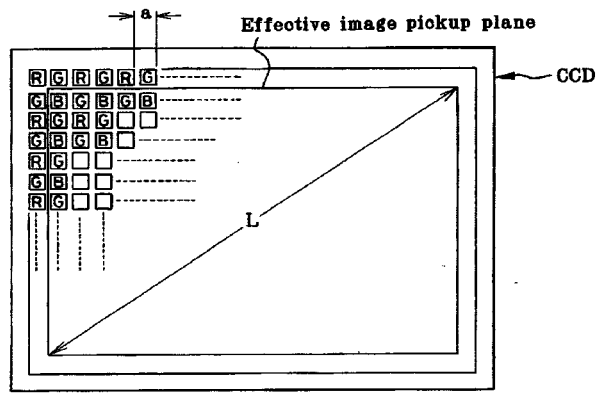
FIG. 10 is illustrative of the diagonal length of the effective image pickup plane of an electronic image pickup device upon phototaking.

Here the diagonal length L of the effective image pickup plane and the pixel spacing $a$ are explained. FIG. 10 is illustrative of one exemplary pixel array for an image pickup device, wherein R (red), G (green) and B (blue) pixels or cyan, magenta, yellow and green (G) pixels are mosaically arranged at the pixel spacing $a$. The "effective image pickup plane" used herein is understood to mean a certain area in the photoelectric conversion surface on an image pickup device used for the reproduction of a phototaken image (on a personal computer or by a printer). The effective image pickup plane shown in FIG. 10 is set at an area narrower than the total photoelectric conversion surface on the image pickup device, depending on the performance of the optical system used (an image circle that can be ensured by the performance of the optical system). The diagonal length L of an effective image pickup plane is thus defined by that of the effective image pickup plane. Although the image pickup range used for image reproduction may be variable, it is noted that when the zoom lens of the present invention is used on an image pickup apparatus having such functions, the diagonal length L of its effective image pickup plane varies. In that case, the diagonal length L of the effective image pickup plane according to the present invention is defined by the maximum value in the widest possible range for L.

The infrared cut means includes an infrared cut absorption filer IF and an infrared sharp cut coat. The infrared cut absorption filter IF is formed of a glass having an infrared absorber therein, and the infrared sharp cut coat cuts infrared rays by reflection rather than by absorption. Instead of this infrared cut absorption filter IF, it is thus acceptable to use a low-pass filter LF or dummy transparent plane plate with an infrared sharp cut coat applied directly thereon.

Preferable in this case, the near-infrared sharp cut coat is designed to have a transmittance of at least 80% at 600 nm wavelength and a transmittance of up to 10% at 700 nm wavelength. More specifically, the near-infrared sharp cut coat has a multilayer structure made up of such 27 layers as mentioned below; however, the design wavelength is 780 nm.

| Substrate | Material | Physical Thickness (nm) | λ/4 |
|---|---|---|---|
| 1st layer | $Al_2O_3$ | 58.96 | 0.50 |
| 2nd layer | $TiO_2$ | 84.19 | 1.00 |
| 3rd layer | $SiO_2$ | 134.14 | 1.00 |
| 4th layer | $TiO_2$ | 84.19 | 1.00 |
| 5th layer | $SiO_2$ | 134.14 | 1.00 |
| 6th layer | TiO2 | 84.19 | 1.00 |
| 7th layer | $SiO_2$ | 134.14 | 1.00 |
| 8th layer | $TiO_2$ | 84.19 | 1.00 |
| 9th layer | $SiO_2$ | 134.14 | 1.00 |
| 10th layer | $TiO_2$ | 84.19 | 1.00 |
| 11th layer | $SiO_2$ | 134.14 | 1.00 |
| 12th layer | $TiO_2$ | 84.19 | 1.00 |
| 13th layer | $SiO_2$ | 134.14 | 1.00 |
| 14th layer | $TiO_2$ | 84.19 | 1.00 |
| 15th layer | $SiO_2$ | 178.41 | 1.33 |
| 16th layer | $TiO_2$ | 101.03 | 1.21 |
| 17th layer | $SiO_2$ | 167.67 | 1.25 |
| 18th layer | $TiO_2$ | 96.82 | 1.15 |
| 19th layer | $SiO_2$ | 147.55 | 1.05 |
| 20th layer | $TiO_2$ | 84.19 | 1.00 |
| 21st layer | $SiO_2$ | 160.97 | 1.20 |
| 22nd layer | $TiO_2$ | 84.19 | 1.00 |
| 23rd layer | $SiO_2$ | 154.26 | 1.15 |
| 24th layer | TiO2 | 95.13 | 1.13 |
| 25th layer | $SiO_2$ | 160.97 | 1.20 |
| 26th layer | $TiO_2$ | 99.34 | 1.18 |
| 27th layer | $SiO_2$ | 87.19 | 0.65 |

Air

Figure 11:
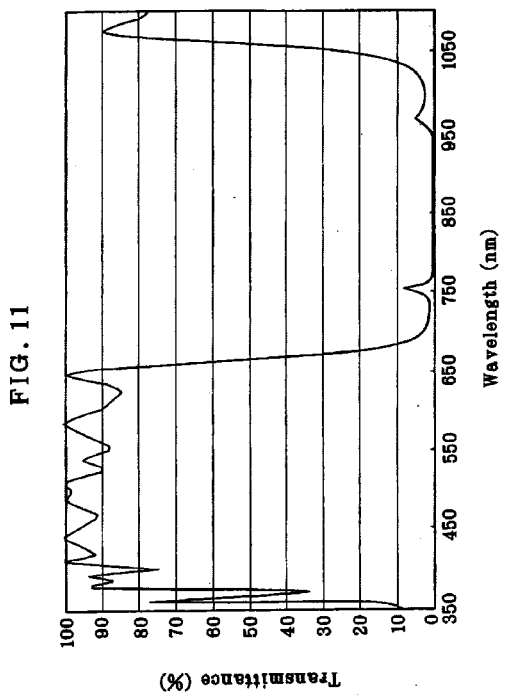
FIG. 11 is a diagram indicative of the transmittance characteristics of one example of the near-infrared sharp cut coat.

The aforesaid near-infrared sharp cut coat has such transmittance characteristics as shown in FIG. 11.

Figure 12:
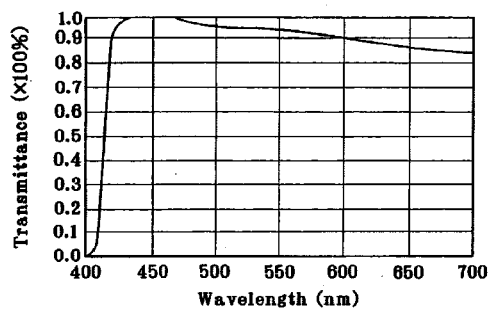
FIG. 12 is a diagram indicative of the transmittance characteristics of one example of the color filter located on the exit surface side of the low-pass filter.

The low-pass filter LF is provided on its exit surface side with a color filter or coat for reducing the transmission of colors at such a short wavelength region as shown in FIG. 12, thereby making the color reproducibility of an electronic image much higher.

Preferably, that filter or coat should be designed such that the ratio of the transmittance of 420 nm wavelength with respect to the transmittance of a wavelength in the range of 400 nm to 700 nm at which the highest transmittance is found is at least 15% and that the ratio of 400 nm wavelength with respect to the highest wavelength transmittance is up to 6%.

It is thus possible to reduce a discernible difference between the colors perceived by the human eyes and the colors of the image to be picked up and reproduced. In other words, it is possible to prevent degradation in images due to the fact that a color of short wavelength less likely to be perceived through the human sense of sight can be readily seen by the human eyes.

When the ratio of the 400 nm wavelength transmittance is greater than 6%, the short wavelength region less likely to be perceived by the human eyes would be reproduced with perceivable wavelengths. Conversely, when the ratio of the 420 nm wavelength transmittance is less than 15%, a wavelength region perceivable by the human eyes is less likely to be reproduced, putting colors in an ill-balanced state.

Such means for limiting wavelengths can be more effective for image pickup systems using a complementary colors mosaic filter.

In each of the aforesaid examples, coating is applied in such a way that, as shown in FIG. 12, the transmittance for 400 nm wavelength is 0%, the transmittance for 420 nm is 90%, and the transmittance for 440 nm peaks or reaches 100%.

With the synergistic action of the aforesaid near-infrared sharp cut coat and that coating, the transmittance for 400 nm is set at 0%, the transmittance for 420 nm at 80%, the transmittance for 600 nm at 82%, and the transmittance for 700 nm at 2% with the transmittance for 450 nm wavelength peaking at 99%, thereby ensuring more faithful color reproduction.

The low-pass filter LF is made up of three different filter elements stacked one upon another in the optical axis direction, each filter element having crystallographic axes in directions where, upon projected onto the image plane, the azimuth angle is horizontal (=0°) and ±45° therefrom. Three such filter elements are mutually displaced by $a$ μm in the horizontal direction and by $SQRT(1/2) \times a$ in the ±45° direction for the purpose of moiré control, wherein SQRT means a square root.

Figure 13:
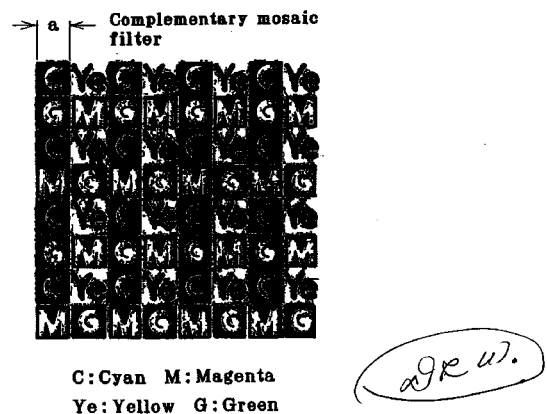
FIG. 13 is a schematic illustrative of how the color filter elements are arranged in the complementary colors mosaic filter.

The image pickup plane I of a CCD is provided thereon with a complementary colors mosaic filter wherein, as shown in FIG. 13, color filter elements of four colors, cyan, magenta, yellow and green are arranged in a mosaic fashion corresponding to image pickup pixels. More specifically, these four different color filter elements, used in almost equal numbers, are arranged in such a mosaic fashion that neighboring pixels do not correspond to the same type of color filter elements, thereby ensuring more faithful color reproduction.

Figure 14:
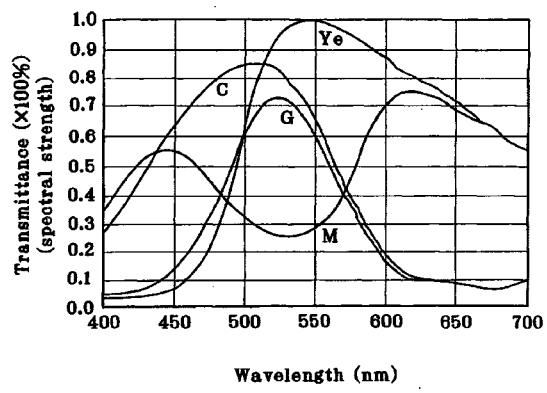
FIG. 14 is a diagram indicative of one example of the wavelength characteristics of the complementary colors mosaic filter.

To be more specific, the complementary colors mosaic filter is composed of at least four different color filter elements as shown in FIG. 14, which should preferably have such characteristics as given below.

Each green color filter element G has a spectral strength peak at a wavelength $G_P$, each yellow filter element $Y_e$ has a spectral strength peak at a wavelength $Y_P$, each cyan filter element C has a spectral strength peak at a wavelength $C_P$, and each magenta filter element M has spectral strength peaks at wavelengths $M_{P1}$ and $M_{P2}$, and these wavelengths satisfy the following conditions.

510 nm<$G_P$<540 nm 5 nm<$Y_P-G_P$<35 nm

−100 nm<$C_P-G_P$<−5 nm 430 nm<$M_{P1}$<480 nm 580 nm<$M_{P2}$<640 nm

To ensure higher color reproducibility, it is preferred that the green, yellow and cyan filter elements have a strength of at least 80% at 530 nm wavelength with respect to their respective spectral strength peaks, and the magenta filter elements have a strength of 10% to 50% at 530 nm wavelength with their spectral strength peak.

One example of the wavelength characteristics in the aforesaid respective examples is shown in FIG. 14. The green filter element G has a spectral strength peak at 525 nm. The yellow filter element $Y_e$ has a spectral strength peak at 555 nm. The cyan filter element C has a spectral strength peak at 510 nm. The magenta filter element M has peaks at 445 nm and 620 nm. At 530 nm, the respective color filter elements have, with respect to their respective spectral strength peaks, strengths of 99% for G, 95% for $Y_e$, 97% for C and 38% for M.

For such a complementary colors filter, such signal processing as mentioned below is electrically carried out by means of a controller (not shown) (or a controller used with digital cameras).

For luminance signals, $Y=|G+M+Y_e+C| \times 1/4$

For chromatic signals, $R-Y=|(M+Y_e)-(G+C)|$ $B-Y=|(M+C)-(G+Y_e)|$

Through this signal processing, the signals from the complementary colors filter are converted into R (red), G (green) and B (blue) signals.

In this regard, it is noted that the aforesaid near-infrared sharp cut coat may be located anywhere on the optical path, and that the number of low-pass filters LF may be either two as mentioned above or one.

The present electronic image pickup apparatus constructed as described above may be applied to photo-taking systems where object images formed through zoom lenses are received at image pickup devices such as CCDs, inter alia, digital cameras or video cameras as well as PCs and telephone sets which are typical information processors, in particular, easy-to-carry cellular phones. Given below are some such embodiments.

Figure 15:
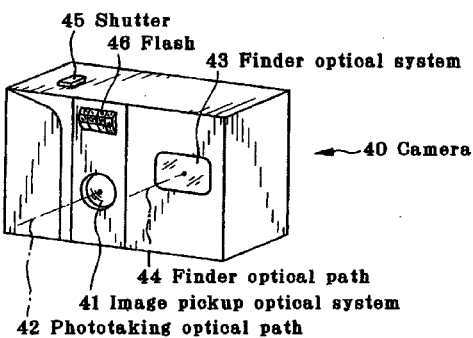
FIG. 15 is a front perspective schematic illustrative of the outside shape of a digital camera with the inventive zoom lens built therein.
Figure 16:
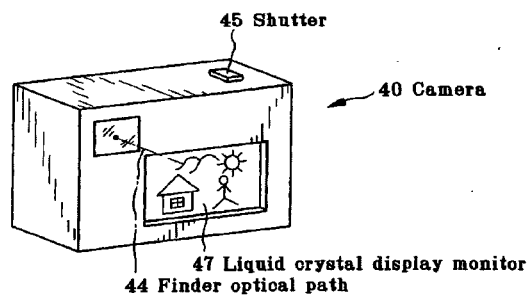
FIG. 16 is a rear perspective schematic of the digital camera of FIG. 15.
Figure 17:
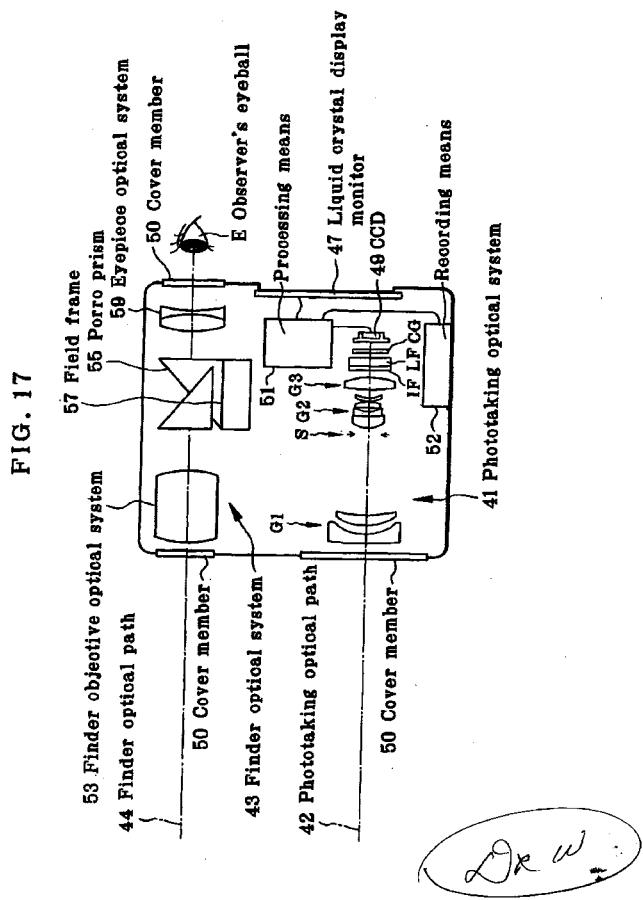
FIG. 17 is a sectional schematic of the digital camera of FIG. 15.

FIGS. 15, 16 and 17 are conceptual illustrations of a phototaking optical system 41 for digital cameras, in which the zoom lens of the present invention is built. FIG. 15 is a front perspective view of the outside shape of a digital camera 40, and FIG. 16 is a rear perspective view of the same. FIG. 17 is a sectional view of the construction of the digital camera 40. In this embodiment, the digital camera 40 comprises a phototaking optical system 41 including a phototaking optical path 42, a finder optical system 43 including a finder optical path 44, a shutter 45, a flash 46, a liquid crystal monitor 47 and so on. As the shutter 45 mounted on the upper portion of the camera 40 is pressed down, phototaking takes place through the phototaking optical system 41, for instance, the zoom lens according to Example 1. An object image formed by the phototaking optical system 41 is formed on the image pickup plane of a CCD 49 via an optical low-pass filter IF comprising a dummy transparent plane plate provided thereon with a near-infrared cut coat and an optical low-pass filter LF. The object image received at CCD 49 is shown as an electronic image on the liquid crystal monitor 47 via processing means 51, which monitor is mounted on the back of the camera. This processing means 51 is connected with recording means 52 in which the phototaken electronic image may be recorded. It is here noted that the recording means 52 may be provided separately from the processing means 51 or, alternatively, it may be constructed in such a way that images are electronically recorded and written therein by means of floppy discs, memory cards, MOs or the like. This camera may also be constructed in the form of a silver halide camera using a silver halide camera in place of CCD 49.

Moreover, a finder objective optical system 53 is located on the finder optical path 44. An object image formed by the finder objective optical system 53 is in turn formed on the field frame 57 of a Porro prism 55 that is an image erecting member. In the rear of the Porro prism 55 there is located an eyepiece optical system 59 for guiding an erected image into the eyeball E of an observer. It is here noted that cover members 50 are provided on the entrance sides of the phototaking optical system 41 and finder objective optical system 53 as well as on the exit side of the eyepiece optical system 59.

With the thus constructed digital camera 40, it is possible to achieve high performance and cost reductions, because the phototaking optical system 41 is constructed of a fast zoom lens having a high zoom ratio at the wide-angle end with satisfactory aberrations and a back focus large enough to receive a filter, etc. therein.

In the embodiment of FIG. 17, plane-parallel plates are used as the cover members 50; however, it is acceptable to use powered lenses.

As can be appreciated from the foregoing explanation, the present invention can provide a zoom lens that is received in a lens mount with smaller thickness and efficiency, has high magnifications and is excellent in image-formation capability even on rear focusing, and enables video cameras or digital cameras to be thoroughly slimmed down.

I claim:

1. An electronic imaging system comprising a zoom lens and an image pickup device located on an image side of the zoom lens, wherein:
the zoom lens comprises, in order from an object side thereof, a first lens group having negative refracting power, a second lens group having positive refracting power and a third lens group having positive refracting power, and further comprises an aperture stop that is interposed between the first lens group and the second lens group and moves in unison with the second lens group,
for zooming from a wide-angle end to a telephoto end of the zoom lens upon focused on an object point at infinity, the second lens group moves only toward the object side and the third lens group moves in a locus different from that of the second lens group while a spacing between adjacent lens groups varies,
the second lens group comprises, in order from an object side thereof, four lens elements, a positive first lens element L21 having an aspheric surface on an object side thereof, a negative second lens element L22, a positive third lens element L23 and a negative fourth lens element L24, wherein the first lens element L21 and the second lens element L22 are cemented together,
the third lens group moves independently during focusing, and
the second lens group satisfies the following conditions (1), (2) and (3):

$$0 < \nu_{23} - \nu_{24} < 35 \quad (1)$$

$$-0.4 < (R_{23F} + R_{23R})/(R_{23F} - R_{23R}) < 0.6 \quad (2)$$

$$0.3 < L/f_{2R} < 0.9 \quad (3)$$

where $\nu_{23}$ is a d-line based Abbe number of the third lens element L23 in the second lens group, $\nu_{24}$ is a d-line based Abbe number of the fourth lens element L24 in the second lens group, $R_{23F}$ is an axial radius of curvature of an object side-surface of the third lens element L23 in the second lens group, $R_{23R}$ is an axial radius of curvature of an image side-surface of the third lens element L23 in the second lens group, L is a diagonal length of an effective image pickup area of the image pickup device, and $f_{2R}$ is a composite focal length of the third lens element L23 and the fourth lens element L24 in the second lens group.

2. The electronic imaging system according to claim 1, where the first lens element L21 and the second lens element L22 in the second lens group satisfy the following conditions (4), (5) and (6):

$$0.6 < R_{22R}/R_{21F} < 1.2 \quad (4)$$

$$0.0 < L/R_{22F} < 0.8 \quad (5)$$

$$0.01 < n_{22} - n_{21} < 0.2 \quad (6)$$

where $R_{21F}$ is an axial radius of curvature of an object side-surface of the first lens element L21 in the second lens group, $R_{22F}$ is an axial radius of curvature of an object side-cementing surface of the second lens element L22 in the second lens group, $R_{22R}$ is an axial radius of curvature of an image side-surface of the second lens element L22 in the second lens group, $n_{21}$ is a d-line refractive index of a medium of the first lens element L21 in the second lens group, and $n_{22}$ is a d-line refractive index of a medium of the second lens element L22 in the second lens group.

3. The electronic imaging system according to claim 1, wherein the second lens group has an aspheric surface at a doublet component consisting of the first lens element L21 and the second lens element L22.

4. The electronic imaging system according to claim 1, wherein the third lens element L23 and the fourth lens element L24 in the second lens group are cemented together and satisfy the following condition (7):

$$-0.9 < (R_{23F} + R_{24R})/(R_{23F} - F_{24R}) < 0.1 \quad (7)$$

where $R_{23F}$ is an axial radius of curvature of an object side-surface of the third lens element L23 in the second lens group, and $R_{24R}$ is an axial radius of curvature of an image side-surface of the fourth lens element L24 in the second lens group.

5. The electronic imaging system according to claim 1, wherein the third lens group comprises a positive lens component that satisfies the following condition (8):

$$-0.1 < (R_{3F} + R_{3R})/(R_{3F} - R_{3R}) < 1.5 \quad (8)$$

where $R_{3F}$ and $F_{3R}$ are axial radii of curvature of an object side-surface and an image side-surface of the positive lens component in the third lens group, respectively.

6. The electronic imaging system according to claim 5, wherein the third lens group consists of one positive single lens component.

7. The electronic imaging system according to claim 1, wherein a refracting surface in the third lens group is composed of a spherical surface alone.

8. The electronic imaging system according to claim 1, wherein a surface shape of a refracting surface in the third lens group satisfies the following condition (12):

$$0 \leq |Asp_{3MAX}|/|Asp_{2MAX}| \leq 0.5 \quad (12)$$

where $Asp_{3MX}$ is a maximum amount value of displacement of an aspheric surface with respect to a spherical surface of each refracting surface in the third lens group wherein the spherical surface has an axial radius of curvature, as measured at a height from an optical axis of the zoom lens wherein the height is located at a position that is 7/10 of a maximum radius value of the stop, and $Asp_{2MX}$ is a maximum amount value of displacement of an aspheric surface with respect to a spherical surface of each refracting surface in the second lens group wherein the spherical surface has an axial radius of curvature, as measured at a height from the optical axis of the zoom lens wherein the height is located at a position that is 7/10 of the maximum radius value of the stop.

9. The electronic imaging system according to claim 1, wherein upon zooming from a wide-angle end to a telephoto end of the zoom lens, the third lens group moves toward an image side of the zoom lens in a convex locus.

10. The electronic imaging system according to claim 1, wherein the first lens group comprises two lens elements, a negative lens element including an aspheric surface and a positive lens element, and satisfies the following conditions (9) and (10):

$$20 < \nu_{11} - \nu_{12} \tag{9}$$

$$-10 < (R_{13} + R_{14})/(R_{13} - R_{14}) < -2.0 \tag{10}$$

where $\nu_{11}$ is a d-line based Abbe number of the negative lens element in the first lens group, $\nu_{12}$ is a d-line based Abbe number of the positive lens element in the first lens group, $R_{13}$ is an axial radius of curvature of an object side-surface of the positive lens element in the first lens group, and $R_{14}$ is an axial radius of curvature of an image side-surface of the positive lens element in the first lens group.

11. The electronic imaging system according to any one of claims 1 to 10, wherein the first lens group comprises two lens elements, a negative lens element and a positive lens element with an air separation interposed therebetween, and satisfies the following condition (11):

$$0.2 < d_{11}/L < 0.65 \tag{11}$$

where $d_{11}$ is an axial air separation between the negative lens element and the positive lens element in the first lens group.

12. The electronic imaging system according to claim 1, wherein a diagonal length L of an effective image pickup area of the image pickup device satisfies the following condition:

$$3.0 \text{ mm} < L < 12.0 \text{ mm}.$$

13. The electronic imaging system according to claim 1, wherein a half angle of view of the zoom lens at the wide-angle end ranges from 27° to 42°.

* * * * *